Oct. 7, 1958

W. JUDA 2,854,792

METHOD AND APPARATUS FOR PROPAGATING ALGAE CULTURE

Filed Sept. 20, 1956

Inventor:
Walter Juda,
by
Attorney

United States Patent Office 2,854,792
Patented Oct. 7, 1958

2,854,792
METHOD AND APPARATUS FOR PROPAGATING ALGAE CULTURE

Walter Juda, Lexington, Mass., assignor to Ionics, Incorporated, Cambridge, Mass., a corporation of Massachusetts Application September 20, 1956, Serial No. 610,950

7 Claims. (Cl. 47—58)

This invention relates generally to process and apparatus for the production of microorganisms capable of photosynthesis. More particularly this invention relates to a method and apparatus for propagating an algae culture to effect a rapid, efficient, and economical multiplication of the same, whereby useful products such as foods, proteins, fats, chlorophyll, vitamins, antibiotics, etc. may be subsequently obtained.

Algae, like other plants containing chlorophyll, are able to convert inorganic compounds into organic matter by means of photosynthesis. Although algae vary in size it is the unicellular forms of algae aquatic plants with which this invention is chiefly concerned.

Previous investigations reveal the strong influence of diurnal alternation of light and dark periods in the photosynthesis of microorganisms. The essential light sensitive reaction of photosynthesis stops when the light goes off and resumes when the light comes on. Cell division, however, may continue during the night at the same rate or even at an increased rate, depending on the temperature at the time and perhaps the preceding history of the culture.

It is furthermore known that the cells of green algae can utilize in photosynthesis only a small and limited amount of light energy at a time. For example, for *Chlorella pyrenoidosa* the so-called saturation intensity (i. e. light energies which can be utilized per unit of time in photosynthesis) light is of the order of 400 F. C. (foot candles). On the other hand, in the summer time, incident sun intensity in the middle of the day is at least 8000 F. C. It is apparent then that in optimum conditions of sunlight only 20% of the incident visible energy is utilized for photosynthesis. Thus, the light saturation effect accounts for the fact that a 20 fold increase in the incident energy results in only a 4 fold increase in the amount utilized by the algae.

Previous attempts for large scale commercial propagation of algae cells were directed to the use of containers with open upper surfaces, flow through transparent plastic tubes, trenches, or open ponds in which the culture is stirred or otherwise prevented from settling. These attempts, however, have certain disadvantages such as lack of protection against dirt and foreign organisms, lack of confinement of nutrient gases ($CO_2$), etc, and have otherwise proved to be ineffective, uneconomical and inefficient.

This invention is based upon the principle that algae can utilize light in very short flashes, and particularly an algal cell can absorb efficiently high intensity light in the first stage of photosynthesis and utilize it in comparatively dark areas.

The present invention produces algal cultures in batch or continuous process by spraying droplets or forming films of an aqueous algal suspension containing appropriate nutrients and conditioners, such as nutrient salts, trace minerals, etc. in air which may be appropriately enriched with other nutrient gases such as $CO_2$ (0.1 to 5%). The fine dispersion or film of algal suspension may be effected in a closed, partially closed or open area with collecting side walls whereby said dispersions, films or droplets are exposed to the full intensity of the rays of natural or artificial sunlight for short periods of time allowing them then to return to the comparative darkness of a culture reservoir. This novel procedure allows for efficient conversion of intense sunlight in the first stage of photosynthesis. It will also be apparent that the cooling effect which is inherent in the partial evaporation of the films or droplets provides a means for at least partial control of temperature in the apparatus. Thus, in addition to providing efficient light utilization for photosynthesis, the present invention provides a means for at least partial control of temperature through the inherent cooling effect of evaporation of solution in the finely dispersed or filmlike forms.

It is an object of the present invention to provide process and apparatus which are suitable for large scale production of algae and other microorganisms having photosynthetic capability.

Another object of this invention is to provide an efficient process of the above character which will provide effective and efficient photosynthesis by algae.

A further object of this invention is to provide an algal process of the above character having optimum growth and maximum yield.

Another object of this invention is to provide a process and apparatus for continuously producing algae on a large commercial scale.

Another object of this invention is to provide a process which is economical and efficient with respect to use of light energy and continuous harvesting of algae.

Additional objects and features of the present invention will appear from the following descriptions in conjunction with the accompanying drawings, wherein.

Figure 1:
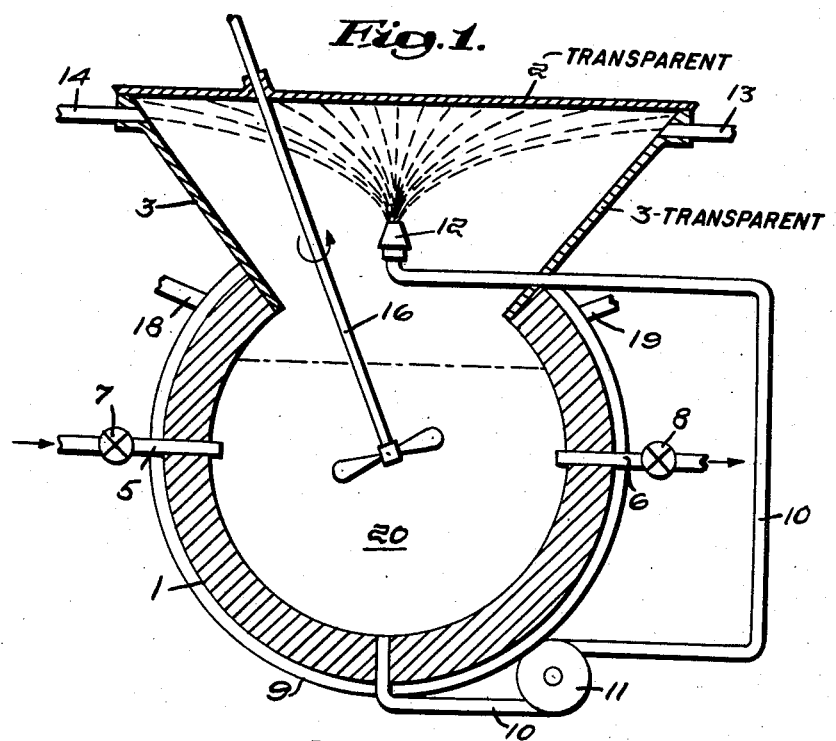
Figure 1 is a schematic side elevational view of apparatus partly in section for carrying out the present invention.

Figure 1 of the drawing schematically illustrates apparatus wherein a closed container is employed utilizing continuous recirculation of an algae culture. The apparatus includes means for continuously removing a portion of the culture and continuously introducing feed liquor.

The apparatus consists of a container 1 of any size or shape and is closed at the top by cover 2 as shown in the drawing. Container 1 is preferably round in contour with outwardly flared wall 3 extending from the container 1 to the cover 2. Both cover 2 and wall 3 are made of light transparent material such as glass, transparent plastics, etc. The container 1 has inlet conduit 5 and outlet conduit 6 at opposite sides, each conduit having valves 7 and 8, respectively, to control the rate of feed and product flow. A heat exchange jacket 9 surrounds container 1 for control of temperature of the liquid algae culture 20. Jacket 9 has entrance and exit connections 19—18 and is connected to suitable means for circulating a cooling or heating fluid therethrough. The conduit 10 extends from the bottom of the container 1 through the jacket 9 and by virtue of pump 11 therein provides for circulation of the liquid medium 20 in container 1 into the space above container 1 that is confined between the flared wall 3 and cover 2. A perforated orifice 12, or other spray means, is provided at the outlet of conduit 10 whereby the algae culture is dispersed or sprayed in a fine film into ambient atmosphere of air or carbon dioxide, the latter being provided for by a conduit 13 and outlet 14. A stirrer 16 extending into the liquid medium 20 provides for the proper suspension of said culture in its aqueous medium.

The operation of the apparatus shown in Figure 1 is as follows:

Container 1 is filled at least partially with a nutrient medium 20 inoculated with an appropriate microorganism. The flow of cooling or heating fluid through pipe 19—18 is regulated either manually or preferably automatically to maintain the temperature of the liquid medium within a range optimum for the growth of the particular microorganism being produced. Such temperatures are usually within the range of 15° to 30° C. Valve 7 in feed conduit 5 is then closed and pump 11 withdraws a steady stream of the liquid medium which is maintained in the form of a suspension by stirrer 11 and forces the same through the sprinkler of sprayer 12 into the upper closed space of the apparatus to form a fine dispersion or fine film of said liquid medium in contact with the air and carbon dioxide entering into the upper space of the container through pipe 13. Depending upon the force of the spray, some of the dispersed liquid medium will fall through the ambient atmosphere back into the reservoir of liquid medium 20 and some will accumulate on flared wall 3 and return to container 1 in the form of fine films. The source of light, which may be natural or artificial sunlight, is located above or near the top side of the container, the rays therefrom penetrating into the top area of the apparatus. After the growth of the culture has reached a satisfactory level a continuous feed and product withdrawal is instituted for continuous operation.

Figure 2:
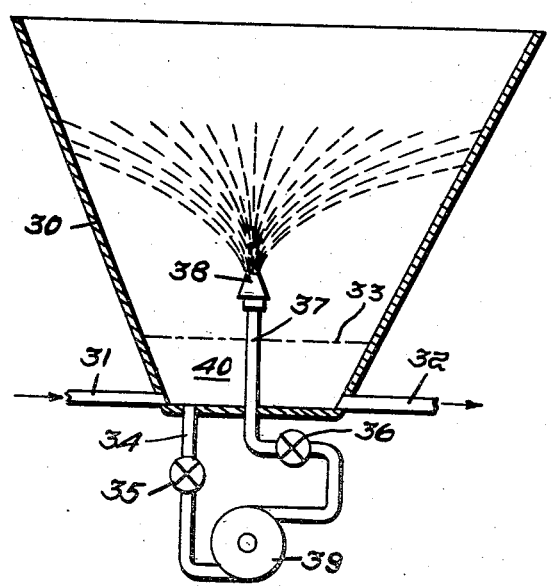
Figure 2 is a similar view of a variation of the apparatus of Figure 1.

Figure 2 schematically illustrates an open type apparatus wherein outwardly flared side-walled container 30 is provided with feed inlet and product removal conduits 31 and 32, respectively, the liquid medium level 33 being maintained at or below orifice 38 in container 30. Outlet conduit 34 leading from the bottom of container 30 passes the algae culture from the reservoir 40 through valve 35 into pump 39 which forces the same through control valve 36 into pipe 37 which terminates in an orifice 38 into container 30 above the level 33 of the culture reservoir 40.

It is apparent that the operation of the apparatus of Figure 2 is very similar to the apparatus of Figure 1. The temperature of the algae culture is here retained below 30° C. by virture of the inherent partial evaporation of the thin film and fine dispersion of the algae culture in the open atmosphere of the upper portion of container 30. Furthermore, no provision for carbon dioxide in the atmosphere need be made since the ambient atmosphere is often sufficient for the purpose. It is clear that there is a continuous recycle of the algae culture from the reservoir 40 through the orifice 38 at the top of spray conduit 37 and with sunlight penetrating into the upper atmosphere of container 30. An intermittent photosynthesis of the algae culture will be effected in a continuous efficient and economical manner.

The following examples are given by way of illustration, but not as necessarily limiting the scope of the invention:

*Example 1*

The apparatus of Figure 1 was used, with a suspension of *Chlorella pyrenoidosa* at a concentration of 0.36 gm. dry weight per liter of solution. The aqueous suspension in the container contained the following nutrient chemicals in solution:

| | |
|---|---|
| $NH_4Cl$ | 0.002 M |
| $K_2CO_3$ | 0.03 M |
| $MgSO_4$ | 0.01 M |
| $KH_2PO_4$ | 0.01 M |
| $FeCl_3$ | $5\times10^{-6}$ M | adjusted with HCl to pH 6.0.

The feed solution contained the above nutrients without any algae, but with entrained air with 5% by volume of added $CO_2$. The jacket was used to maintain the temperature at 22° C., and the pump recirculated and atomized the suspension into a fine spray which settled back into the container after exposure to light in the upper portion of the container. Gas was withdrawn, enriched in oxygen and depleted in $CO_2$. A continuous overflow of product was maintained, at a rate of 5 ml./minute, adjusted to provide a constant Chlorella concentration of 0.3 gm. dry weight per liter.

*Example 2*

The apparatus of Figure 2 was fed with the nutrient solution of Example 1, after initially seeding the open trough with Chlorella at a concentration of 0.25 gm. dry weight/liter. A product of this composition was withdrawn at a rate of 1 liter per hour.

Having thus disclosed my invention and described in detail preferred embodiments thereof so that any person skilled in the art may practice it, I claim and desire to secure by Letters Patent:

1. In the photosynthesis of a culture of microorganisms in a nutrient medium including nutrient salts for microorganisms, air and carbon dioxide, the step of continuously forming a fine dispersion of at least a portion of said culture in the presence of light until a desired predetermined density of said microorganisms is obtained.

2. In the photosynthesis of algae in liquid media containing nutrients therefor, the steps of withdrawing at least a portion of said medium from a reservoir thereof, dispersing the same in the form of fine particles into an atmosphere containing oxygen and carbon dioxide in the presence of light, returning the light treated particles in the form of fine films of liquid medium to the reservoir thereof, and continuously repeating the operation until a desired predetermined density of algae cells is obtained.

3. The process of claim 2 which includes the step of continuously feeding and bleeding liquid medium and product respectively to provide for continuous large scale operation.

4. The process of claim 2 wherein the forming of the fine dispersion of the culture is obtained by intermittant spraying of the same.

5. Apparatus for the continuous culture and harvesting of Chlorella and like photosynthetic microorganisms, comprising a container having outwardly flared walls at the top section of said container and adapted to admit light to the interior thereof, means for continuously introducing and removing controlled amounts of aqueous nutrient-containing liquid in the bottom section of said container, means for continuously withdrawing portions of said nutrient-containing liquid from the bottom of said container, and means for continuously spraying said withdrawn liquid into the atmosphere at the top flared walled section with sufficient force to cause said spray to form films of the dispersed fine particles of liquid in contact with said outwardly flared walls of the upper section of said container whereby a continuous recirculation and dispersion of said nutrient liquid exposed to light is effected.

6. The apparatus of claim 5 wherein the container is closed by a light transparent cover at the top thereof, and means in the upper section of said container for introducing and withdrawing nutrient gases in said container.

7. The apparatus of claim 5 wherein the top of said outwardly flared walled ocntainer is open to the ambient atmosphere.

References Cited in the file of this patent

UNITED STATES PATENTS

| | | |
|---|---|---|
| 1,654,379 | Matzka | Dec. 27, 1927 |
| 2,732,662 | Myers | Jan. 31, 1956 |

OTHER REFERENCES

Kingzett's Chemical Encyclopaedia, Eighth Edition, Published 1952 by Bailliere, Tindall and Cox (London, England). Pages 322 through 325.

"Algal Culture" (Burlew), Published 1953 by Carnegie Institution of Washington (D. C.), as Publication 600. Pages 16, 135, 136, 137, 138, 275.